Oct. 28, 1969                J. A. MAURER, JR                    3,475,085
                    MOTION PICTURE PROJECTOR WITH SOUND
                           REPRODUCING MECHANISM
Original Filed July 27, 1962                              2 Sheets-Sheet 2

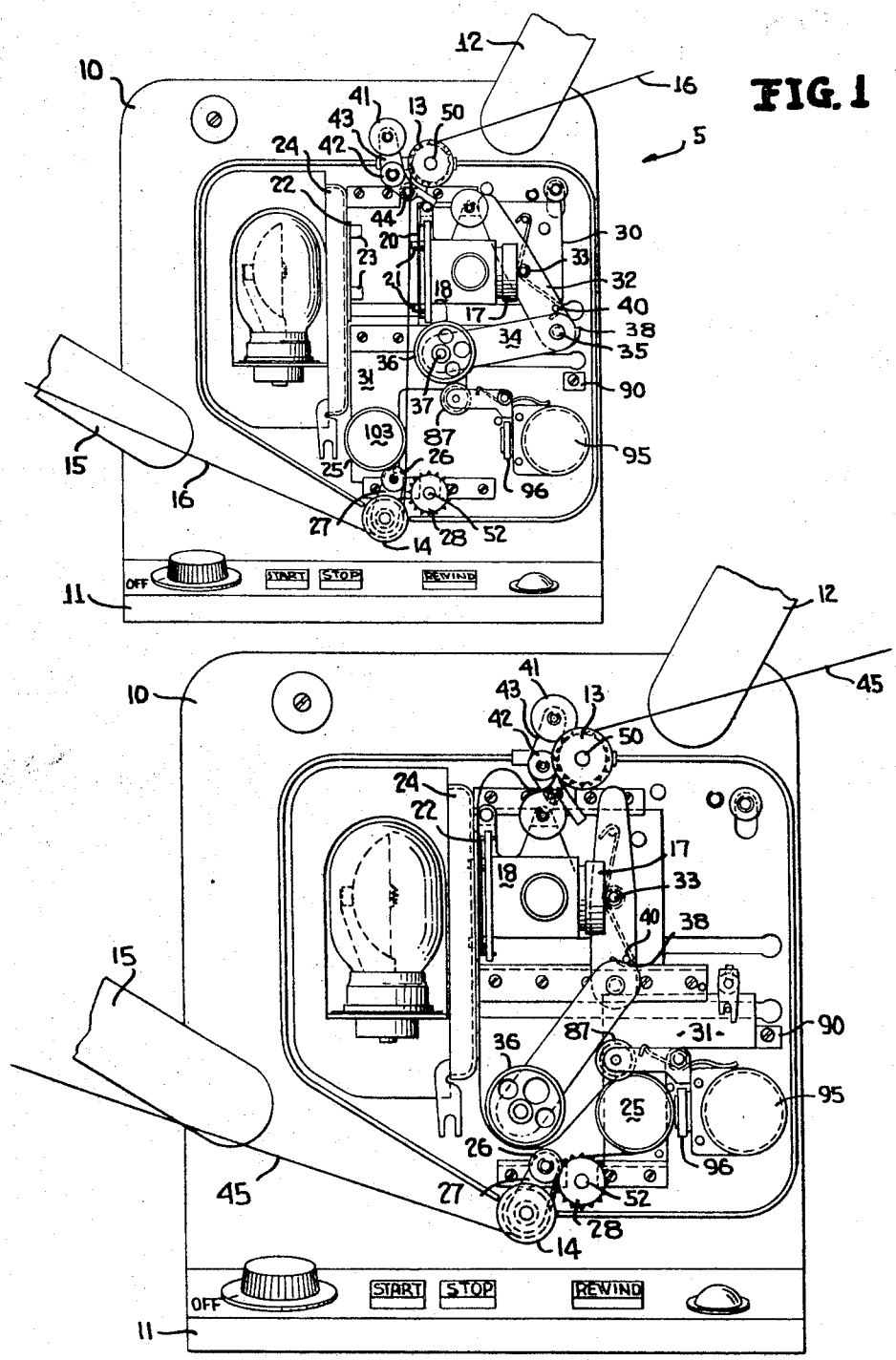

INVENTOR
JOHN A. MAURER, Jr.
BY
Mason, Porter, Diller & Brown
ATTORNEYS

United States Patent Office 3,475,085
Patented Oct. 28, 1969

3,475,085
MOTION PICTURE PROJECTOR WITH SOUND REPRODUCING MECHANISM
John A. Maurer, Jr., Somerset, N.J., assignor to J.M.D Industries, Inc., New York, N.Y., a corporation of New York
Original application July 27, 1962, Ser. No. 212,858, now Patent No. 3,259,291, filed July 5, 1966. Divided and this application July 1, 1966, Ser. No. 562,231
Int. Cl. G03b 31/02
U.S. Cl. 352—29                                    12 Claims

ABSTRACT OF THE DISCLOSURE

A motion picture projector has the projection lens mounted on one slide member and a sound reproducing drum mounted on a second slide member. When the projector is being threaded the first slide member is in a forward position and the second slide member is in a rearward position such that the film may be inserted in a straight path through the projector. When the projector motor is started a rack and pinion drive moves the first slide member rearwardly and the second slide member forwardly to form the correct film path for projection and sound reproduction. The sound reproducing drum is driven thru a viscous coupling in series with a friction coupling.

---

This application constitutes a divisional application of application Ser. No. 212,858, filed July 27, 1962, and now Patent No. 3,259,291.

This invention relates to motion picture projectors and, in particular, to portable motion picture projectors made to use the smaller sizes of film, such as 16 mm. and 8 mm. film.

In the great majority of sound motion picture projectors which have been made in the past the devices incorporated therein for reproducing sound from sound tracks on motion picture film require comparatively massive flywheels which are directly connected either to a sound reproducing drum or to a film motion stabilizing roller about which the film is wrapped at a point not far from the point at which the sound is reproduced.

Such construction must meet the fundamental requirement that the steady speed at which the film moves where it is frictionally coupled to the flywheel is exactly equal to the average speed at which the film is driven by toothed sprockets or other devices in the projector which engage it by its perforations. This is the necessary condition for exact synchronism of picture and sound.

In all projector mechanisms which use flywheels this necessary identity of speeds is obtained by causing the film to control the speed of rotation of the flywheel. In many cases the film itself transmits the power to drive the flywheel. If means other than the film impart rotary motion to the flywheel it is necessary to have these driving means loosely coupled to the flywheel so that the film can either hold back the flywheel slightly or, alternatively, supply a small part of the required driving power, thus causing the flywheel to rotate slightly faster than the speed at which it is driven by the auxiliary driving means. In either of these cases the control of the speed or rotation of the flywheel requires the development of a certain amount of tension in either the strand of film that is going toward the point where it is frictionally coupled to the flywheel or in the strand proceeding from this point.

Because the strands of film referred to above must be operatively connected to the flywheel (or to rollers attached to it) at all times, certain inconvenient limitations are encountered in the design of mechanism of the class described. If the flywheel is made large enough and massive enough to be highly efficient in stabilizing the speed of rotation of the parts to which it is attached, it is generally found that the forces developed in the film strands in the process of starting the projector and bringing the flywheel up to operating speed are great enough to damage the film. Therefore, the size of the flywheel must be limited, and less efficient motion stabilization results.

An even more serious limitation on the size of the flywheel is encountered in designing portable equipment to be used with 16 mm. and especially 8 mm. film. In such equipment there is commonly an upper limit to the weight which will be acceptable, and since the flywheel may represent a large fraction of the total weight, there is effectively an upper limit to the weight of the flywheel that can be used. In most cases a flywheel within this weight limit is not large enough to perform its function efficiently.

In keeping with the above, it is a primary object of this invention to provide a portable motion picture projector having novel means for reproducing synchronous sound, in which the motion filtering function is performed efficiently by a flywheel much smaller than is required by the constructions of the prior art.

A second object of this invention is to provide a sound reproducing mechanism for motion picture film in which the flywheel is driven by means independent of the film and in which when the mechanism is started the flywheel is brought up to very nearly its operating speed of rotation before connection between the flywheel and the film is established.

A third object of the invention is to provide a sound motion picture projector in which a sound reproducing drum can be displaced from the position in which it operates during sound reproduction in such manner that this sound reproducing drum can serve as one of the elements of an automatic film threading mechanism.

A further object of this invention is to provide a novel motion picture projector including means for feeding film between cooperative sound reproducing means, one of the sound reproducing means being a rotatable member, means for rotating the rotatable member, the rotating means including a driven shaft, first means coupling the driven shaft to a drive member whereby motion imparted to the latter rotates the former, a flywheel carried by the driven shaft, and second means coupling the driven shaft to the rotatable member whereby rotation of the driven shaft imparts rotation to the rotatable member through the second coupling means.

A further object of this invention is to provide a novel motion picture projector of the type heretofore described wherein the first coupling means is a relatively readily rotatable friction-type connection which includes a viscous medium between the driven shaft and the drive member whereby irregular motion of the rotatable member is precluded, and the second coupling means is a friction drive between the driven shaft and the rotatable member.

Still another object of this invention is to provide a novel motion picture projector of the type heretofore described including means for moving the sound reproducing means relative to each other between a first relatively spaced position and a second position at which the sound reproducing means and a portion of film disposed therebetween are in contiguous relationship to each other, and said driven shaft is operative to drive said rotatable member only in the second position of the sound reproducing means.

A further object of this invention is to provide a novel motion picture projector including each of the components heretofore described and further including a main support, the driven shaft having axially opposite end portions projecting outwardly of opposite sides of the support, the flywheel and driven member being positioned adjacent one of the opposite end portions at one side of the support, and the rotatable member and the other of the opposite end portions being positioned at an opposite side of the support in alignment for contact with each other upon the relative movement of the sound reproducing means from the first to the second position thereof.

With the above and other objects in view that will hereinafter appear, the nature of the invention will be more clearly understood by reference to the following detailed description, the appended claims and the several views illustrated in the accompanying drawings.

In the drawings:

FIGURE 1 is a fragmentary side perspective view of an illustrative embodiment of the portable motion picture projector of this invention with covers thereof removed, and illustrates the projector parts in a position after a strand of film has been inserted into a film slot and initially tensioned by manually rotating a take-up reel after the leading end of the film has been connected thereto.

FIGURE 2 is a fragmentary side elevational view similar to FIGURE 1, and illustrates the positions occupied by the projector parts after the film has been automatically threaded and is ready to advance in the normal way during a projection operation.

Figure 3:
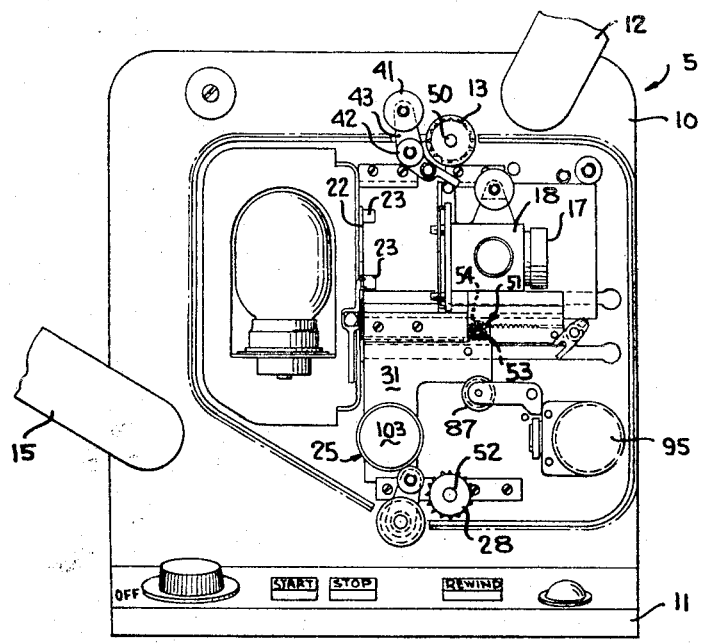
FIGURE 3 is a fragmentary side elevational view similar to FIGURE 4 with parts broken away for clarity, and more clearly illustrates other components of the projector.

Referring to FIGURES 1 through 3 of the drawings, a novel motion picture projector constructed in accordance with this invention is generally designated by the reference numeral 5 and includes an upright support plate 10 to which is fastened at right angles a base 11. A reel (not shown) carrying film to be projected is placed on a spindle (also not shown) of a reel support arm 12, and the end of the film is pulled off to the length of approximately two feet. This film end, or leader, is passed loosely around two film-guide members (not shown) which cause the film to become disposed between a sprocket 13 and a roller 14, in the manner best illustrated in FIGURE 1 of the drawings. The end of the film leader is then attached to the hub of an empty reel (not shown) which is placed on a spindle of a reel support arm 15. The reel is next rotated until the slack of the film has been wound up and occupies the position shown by the heavy solid line 16 in FIGURE 1 of the drawings.

When the film is so positioned it has a space free of obstructions between the sprocket 13 and the roller 14 to the left of a projection lens 17 and its mount 18, and a pressure-plate 20 having guide pins 21 which later hold the film against an apertured plate 22 between guide projections 23, the apertured plate being mounted on a casing 24 in which is housed intermittent movement mechanism and a sector shutter. The film also has a space free of obstructions to the right of a sound-reproducing drum 25 and an idler roller 26 which will later move on its associated lever arm support 27 to hold the film against a holdback sprocket 28. The situation shown in FIGURE 1 of the drawings is the one that exists after the film has been positioned between the sprocket 13 and the roller 14 by the taking up of slack on the take-up reel, but before a motor (not shown) has been started by pushing down the button marked "Start."

The projection lens mount 18 is carried by an upper slide-plate 30 while the sound-reproducing drum 25 is carried by a lower slide-plate 31. A lever 32 is pivoted to the slide-plate 30 on a stud 33 and a second lever 34 is pivoted to the lever 32 on a stud 35. The lever 34 carries at its other end an eccentric roller 36 which can rotate on a stud 37. A projection 38 on the lever 34 and a pin 40 on the lever 32 limit the motion of the lever 34 on its pivot 35.

When the "Start" button is depressed and the motor begins to run, the slide 30 moves to the left, the slide 31 moves to the right, and the levers 32, 34 move the roller 36 to the left and downward. At the same time the sprocket 28 remains motionless while the film is pressed against it by the idler roller 26 on the initial movement of the lower slide 31 to the right from the position shown in FIGURE 1 to that shown in FIGURE 2 of the drawings. Idler rollers 41, 42 carried by a supporting lever 43 and pivoted at 44 are moved against the sprocket 13 by the movement of the slide 30 to the left. By these actions, the straight length of film between the sprocket 13 and the idler roller 14 is progressively modified from the film path 16 (FIGURE 1) into a generally S-shaped pattern and then into a pattern or path 45 shown in FIGURE 2.

The particular drive mechanism (not shown) associated with the projector 5 is completely disclosed in the latter-noted application, and for the purpose of this invention it need only be recognized that the drive mechanism is suitably coupled to appropriately drive three shafts 50 through 52. The shaft 50 is secured to the sprocket 13 while the shaft 52 is secured to the sprocket 28 for driving these latter sprockets in clockwise and counterclockwise directions during respective re-winding and projection modes of operation of the projector 5. The shaft 51 is driven to move the slides 30, 31 from the position illustrated in FIGURES 1 and 3 to the position illustrated in FIGURE 2 to form the film path 45, while reverse rotation of the shaft 51 moves the slides 30, 31 back to the original positions thereof illustrated in FIGURES 1 and 3. The shaft 51 includes two small gears 53, 54 cut on the end which projects outwardly of the vertical support plate 10, as is best illustrated in FIGURE 3 of the drawings. The gear 53 is in mesh with a rack cut in the upper edge of the lower slide-plate 31 while the gear 54 is in mesh with a rack cut in the lower edge of an offset strip 55 fastened to the upper slide-plate 30. As best viewed in FIGURE 3 of the drawings, it will be seen that when the shaft 51 with the gears 53, 54 rotates counter-clockwise, the slide-plate 30 must move to the left and the slide-plate 31 must move to the right.

With reference to FIGURES 2 and 3, the action of the mechanism starting from the time the motor (not shown) is energized may be followed in detail. The differential drive mechanism (not shown) initially drives both the shaft 50 and the shaft 51 in counter-clockwise directions as viewed in FIGURES 2 and 3. As has been stated, the plate 30 is moved to the left from the position illustrated in FIGURES 1 and 3 toward the position illustrated in FIGURE 2 and the plate 31 is moved to the right as is readily apparent from a comparison of these same figures. As the plate 31 approaches its final position (FIGURE 2) a brake (not shown) of the differential drive mechanism is released so that the shaft 52 and the sprocket 28 secured thereto are free to rotate. The film has now been brought into the path 45 shown in FIGURE 2, and it is being advanced through the mechanism in the normal mode for picture projection and sound reproduction.

As is heretofore noted, in almost all conventional devices for reproducing sound from records on motion picture film a comparatively massive flywheel has been directly connected either to a sound-reproducing drum, such as the drum 25, or to a film motion stabilizing roller about which the film is wrapped at a point not too far from the point where the sound is reproduced. In the present construction a small flywheel rotating at a comparatively high speed is coupled to the sound-reproducing drum 25 by frictional contact between an extension of a small shaft on which the flywheel is mounted and a cylindrical surface of the sound-reproducing drum 25 which is formed of rubber or other resilient material having a high coefficient friction. This latter-noted surface is coaxial with the surface on which the film is supported.

Figure 4:
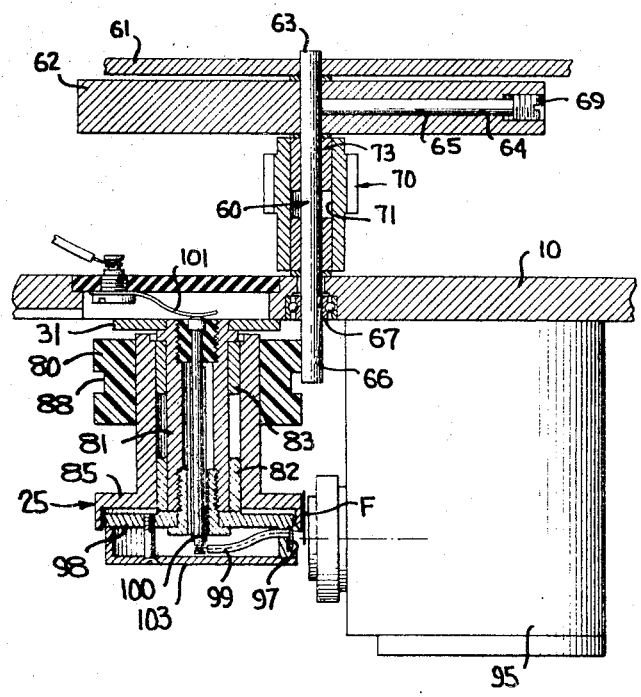
FIGURE 4 is an enlarged cross-sectional view taken generally along the line 4—4 of FIGURE 2 and illustrates the details of sound-reproducing means and a flywheel associated therewith.

Most of the power needed to bring the flywheel up to the proper speed and maintain its rotation is supplied by a gear which has a long bearing on the flywheel shaft, this bearing being filled with a moderately viscous oil. This oil, in effect, provides a loose coupling between the gear and the flywheel shaft. The gear rotates at a speed very slightly higher than the speed at which the flywheel must rotate to provide proper sound-reproduction. Because of the friction of the flywheel shaft in the bearings which support it the flywheel tends to rotate at a slightly lower speed, but the pull of the film, transmitted through the sound-reproducing drum, supplies enough power to offset these frictional losses and maintain a rate of flywheel rotation which exactly matches the rate at which the film is fed by the perforations in it. The viscous coupling between the flywheel shaft and the gear mounted on it permits a slight differential of speed to exist between the gear and the flywheel and shaft without introducing any irregularity of motion. This construction, therefore, meets the fundamental requirement that the motion of the film must be able to control the rotation of the flywheel so that exact synchronism is maintained between the steady rate of motion of the film at the point where it is coupled to the flywheel and the intermittent, or at least less steady, motion imparted to it through the perforations, and it satisfies this requirement in a way that permits the film to be under very moderate tension where it goes to and from the sound-reproducing drum. The drive for the sound-reproducing drum is, therefore, a highly efficient mechanical filtering system. In FIGURES 1 and 4 in particular, a shaft 60 is journaled for rotation about a predetermined axis between the vertical support plate 10 and a plate 61 having end portions (not shown) which are fixedly secured by conventional means to the plate 10. A flywheel 62 is fixed to one end portion 63 of the shaft 60 by means of a pin 64 received in a radial bore 65 of the flywheel 62 and fastened therein by a setscrew 69. The axially opposite end portion 66 of the shaft 60 is journalled by a ball-bearing 67 in the plate 10.

A gear 70, which is in mesh with the differential drive mechanism (not shown) heretofore noted, has a rather long axial hole 71 through which the shaft 60 passes. The hole 71 has pressed into it two bushings 72, 73 of porous sintered bronze which are charged with a moderately viscous oil, such as one of the silicon oils known commercially as "Dow-Corning 120 Fluid" having a viscosity on the order of 1000 centistokes.

It should be understood that the use of bushings of porous bronze is not essential to the operation of the device, and a plain bushing might be used and would function satisfactorily for a long period of time, but the use of the porous bushing insures a supply of oil sufficient to keep the system functioning for a practically unlimited time period. It should be understood also that the viscosity of oil actually required for best operation of the device depends on the clearance between the shaft 60 and the holes (unnumbered) in the bushings 72, 73 and either these clearances or the viscosity of the oil or both may be adjusted to provide more or less traction as is required.

The end portion 66 of the shaft 60 protrudes a distance of approximately 3/8 inch from the plate 10, and this end portion 66 makes contact with a rubber or plastic driving member 80 fixed to one end portion of the sound-reproducing drum 25 when the lower slide-plate 31 is in its extreme right-hand position (FIGURE 2). True running of the end portion 66 of the shaft 60 is insured by constructing the shaft 60 of hardened and dimensionally stabilized steel brought to its finished diameter and at the same time made very straight by a centerless grinding process.

The sound-reproducing drum 25 is mounted for rotation on a post 81 which is fastened to the slide-plate 31 by riveting or other conventional means. Bushings 82, 83 of porous sintered bronze impregnated with a light grade of oil insure that the drum 25 will rotate freely on the post 81.

Still referring to FIGURE 4 of the drawings, it will be seen that the sound-reproducing drum 25 has a front portion 85 of a relatively large diameter which supports the film F when the latter occupies the film path 45. The edge of the film F on which the sound-track is located overhangs the front edge of a peripheral film supporting surface 86 of the drum 25. The opposite edge of the film also overhangs the supporting surface 86 by a small amount. This permits a guide-roller 87 to control the lateral position of the film F at the point it is brought into contact with the sound-reproducing drum 25.

On the side nearer the support plate 10 and the film F, the sound-reproducing drum 25 has a shank of reduced diameter on which the rubber or plastic driving member 80 is mounted. The member 80 is a ring of material having a high coefficient of friction which may be vulcanized to the metal exterior of the drum 25, but this is not necessary if the member 80 is of, for example, rubber or neoprene and if the hole originally made in it is small enough that it may be stretched a substantial amount to place it over the rear portion of the drum 25. The larger diameter of the drum 25 and the cylindrical outer surface of the rubber or plastic driving member 80 are brought to the same diameter and made concentric with the inner surfaces of bushings 82, 83 by grinding with an abrasive wheel on a cylindrical grinding machine.

It may be observed that the driving member 80 is made wider than necessary for its engagement with the driving shaft 60, and that a groove 88 is ground in the center part of its cylindrical surface in order to give a uniform area of engagement with the shaft 60. The increase in width of the member 80 serves the purpose of supporting the actual driving surface both radially and laterally more firmly than it would be supported by a narrower ring of rubber or plastic.

A stop plate 90 shown in FIGURE 1 limits the motion of the lower slide-plate 31 in the direction which brings the sound-reproducing drum 25, or rather the driving member 80, into contact with the end portion 66 of the flywheel shaft 60. The stop-plate 90 may be adjusted to stop the slide-plate 31 at the exact position which gives the proper degree of frictional coupling between the shaft 60 and the rubber or plastic-clad portion or member 80 of the sound-reproducing drum 25. When this adjustment has been made, the stop-plate 90 may be pinned in place or may be held with cement. In either case it will provide a definite end position for the motion of the slide-plate 31 and thus a definite position and definite contact between the member 80 and the shaft 60.

A lamphouse 95 (FIGURES 1 and 4) contains a suitable small lamp (not shown) and supports an optical system whose mounting is shown at 96 to provide a scanning light beam focused on the sound-track of the film F where it passes about the sound-reproducing drum 25, in the manner best illustrated in FIGURE 4 of the drawings. Inasmuch as these parts may be of conventional design, they are not described further in this specification.

The edge of the film carrying the sound-track overhangs the edge of the drum 25 in the manner heretofore noted so that light directed on the sound-track from the optical system 96 can pass directly through the film to reach a photosensitive cell 97 which is mounted on a plate 98 secured to the stud 81 on which the drum 25 rotates. A wire lead 99 from the cell 97 may be connected to a rod 100 which passes through a hole (unnumbered) in the center of the stud 81 to a contactor 101 mounted in the vertical support-plate 10 through which the cell may be connected to an amplifier (not shown) in the manner fully disclosed in the latter-noted application. The cell mounting and the connecting wire may be covered by a shield cap 103. This is only one of several possible arrangements, and it is to be understood that the location of the photosensitive cell 97 and the method of connecting it to the amplifier are not essential parts of this invention.

As is readily apparent from FIGURE 4 of the drawings, the arrangement of the flywheel 62, the friction drive by the gear 70 and the friction drive between the shaft 60 and the member 80 imparts uniform rotation to the sound-reproducing drum 25 irrespective of the intermittent or an irregular motion of the film F. The viscous coupling between the flywheel shaft 60 and the gear 70 permits the slight differential of speed heretofore noted and the film F controls the rotation of the flywheel 62 so that exact synchronism is maintained between the reproduction of sound by the drum 25 and associated circuitry and the projection of a picture during normal operation of the projector 5.

From the foregoing, it will be seen that novel and advantageous provision has been made for carrying out the desired end. However, attention is directed to the fact that other variations may be made in the details of construction and arrangement of parts without departing from the spirit and scope of the invention as defined in the appended claims.

What is claimed is:

1. A motion picture projector of the type equipped with mechanisms for reproducing sound from a sound track on motion picture film comprising first and second cooperative sound-reproducing means disposed in remote spaced relationship from each other in a first position, means for feeding film between said first and second cooperative means when the latter are in said first position, means for relatively moving the first cooperative sound-reproducing means toward said second cooperative sound-reproducing means to accurately position the sound track of the film therebetween, means mounting said first cooperative sound-reproducing means for rotation about a predetermined axis, drive means for rotating said first cooperative sound-reproducing means, said first cooperative sound-reproducing means and said drive means being out of driving engagement in said first position, a flywheel connected to said drive means, and means drivably coupling said drive means and said first cooperative sound-reproducing means during the movement of the latter toward said second cooperative sound-reproducing means.

2. The motion picture projector as defined in claim 1 including means for coupling said drive means to another drive member, and said coupling means including a viscous media between said drive means and said drive member.

3. The motion picture projector as defined in claim 1 wherein said drive means is a shaft having an end portion disposed for contact by a periphery of said first cooperative sound-reproducing means during the movement of said last-mentioned means toward said second sound-reproducing means whereby said drivable coupling means is established by frictional contact between said shaft end portion and the periphery of said first cooperative sound-reproducing means.

4. The motion picture projector as defined in claim 1 wherein said moving means is defined by rack means carrying said first cooperative sound-reproducing means, and pinion means enmeshed with said rack means for imparting movement thereto for moving said first cooperative sound-reproducing means from said first position toward said second sound-reproducing means.

5. The motion picture projector as defined in claim 1 wherein said moving means moves said first cooperative sound-reproducing means transverse to said predetermined axis.

6. The motion picture projector as defined in claim 2 wherein said drive means is a drive shaft, and said coupling means is defined by a sleeve surrounding said drive shaft with the viscous media being disposed therein.

7. The motion picture projector as defined in claim 2 wherein said drive means is a shaft having an end portion disposed for contact by a periphery of said first cooperative sound-reproducing means during the movement of said last-mentioned means toward said second sound-reproducing means whereby said drivable coupling means is established by frictional contact between said shaft end portion and said periphery.

8. The motion picture projector as defined in claim 2 wherein said moving means is defined by rack means carrying said first cooperative sound-reproducing means, and pinion means enmeshed with said rack means for imparting movement thereto.

9. The moton picture projector as defined in claim 2 wherein said moving means moves said first cooperative sound-reproducing means transverse to said predetermined axis.

10. The motion picture projector as defined in claim 3 wherein said moving means is defined by rack means carrying said first cooperative sound-reproducing means, and pinion means enmeshed with said rack means for imparting movement thereto.

11. The motion picture projector as defined in claim 3 wherein said moving means moves said first cooperative sound-reproducing means transverse to said predetermined axis.

12. The motion picture projector as defined in claim 10 wherein said moving means moves said first cooperative sound-reproducing means transverse to said predetermined axis.

References Cited

UNITED STATES PATENTS

| | | | |
|---|---|---|---|
| 2,196,736 | 4/1940 | Merriman | 352—30 |
| 2,570,773 | 10/1951 | Davis | 352—30 |
| 3,016,211 | 1/1952 | Ecker et al. | 352—30 |
| 3,146,318 | 8/1964 | Kuhrt et al. | 352—30 |
| 3,165,593 | 1/1965 | Roman | 352—30 |
| 3,201,796 | 8/1965 | Michaels | 352—30 |
| 3,282,485 | 11/1966 | Floden | 352—30 |

NORTON ANSHER, Primary Examiner

MONROE H. HAYES, Assistant Examiner